(12) United States Patent
Ries et al.

(10) Patent No.: US 8,973,760 B2
(45) Date of Patent: Mar. 10, 2015

(54) FILTER SYSTEM WITH FUEL-WATER SEPARATOR

(75) Inventors: Jeffrey R. Ries, Metamora, IL (US); Christopher Joseph Salvador, Peoria, IL (US); Randall W. Heibenthal, Mahomet, IL (US); Dennis M. Deedrich, Champaign, IL (US); Richard J. Eisenmenger, Philo, IL (US)

(73) Assignees: Advanced Filtration Systems, Inc, Champaign, IL (US); Caterpillar Inc., Peoria, IL (US)

( * ) Notice: Subject to any disclaimer, the term of this patent is extended or adjusted under 35 U.S.C. 154(b) by 429 days.

(21) Appl. No.: 13/230,241

(22) Filed: Sep. 12, 2011

(65) Prior Publication Data

US 2012/0080372 A1 Apr. 5, 2012

Related U.S. Application Data

(60) Provisional application No. 61/389,045, filed on Oct. 1, 2010.

(51) Int. Cl.
| | |
|---|---|
| B01D 35/02 | (2006.01) |
| B01D 35/30 | (2006.01) |
| B01D 36/00 | (2006.01) |
| B01D 29/15 | (2006.01) |
| F02M 37/22 | (2006.01) |

(52) U.S. Cl.
CPC ........... *F02M 37/221* (2013.01); *B01D 36/006* (2013.01); *B01D 2201/295* (2013.01); *Y10S 210/05* (2013.01)
USPC ........ 210/440; 210/493.2; 210/457; 210/443; 210/DIG. 5

(58) Field of Classification Search
CPC ........... B01D 36/006; B01D 2201/295; F02M 37/221
USPC ................. 210/493.2, 440, 457, 443, DIG. 5; 29/428
See application file for complete search history.

(56) References Cited

U.S. PATENT DOCUMENTS

| | | | |
|---|---|---|---|
| 4,253,954 A * | 3/1981 | Midkiff et al. ................. | 210/315 |
| 5,606,989 A | 3/1997 | Roll et al. | |
| 5,769,507 A | 6/1998 | Brockway | |
| 6,139,738 A | 10/2000 | Maxwell | |
| 6,972,092 B1 * | 12/2005 | Roll .............................. | 210/313 |
| 7,217,361 B2 * | 5/2007 | Connor et al. ................ | 210/232 |
| 2007/0170103 A1 * | 7/2007 | Fick .............................. | 210/232 |
| 2009/0078623 A1 | 3/2009 | Lauer | |

FOREIGN PATENT DOCUMENTS

EP 0 715 873 A2 6/1996

OTHER PUBLICATIONS

International Search Report and Written Opinion for related International Application No. PCT/US2011/054127; report dated Dec. 21, 2011.

* cited by examiner

*Primary Examiner* — Nam Nguyen
*Assistant Examiner* — Madeline Gonzalez
(74) *Attorney, Agent, or Firm* — Finnegan, Henderson, Farabow, Garrett & Dunner, LLP

(57) ABSTRACT

A canister filter system includes a base, a canister attachable to the base, and a fluid separator filter having filter media positioned inside the canister. A drain engages and forms a seal with the filter in a closed position. In an open position, the drain allows fluid to be removed from the canister. The structure of the filter is such that the filter may more efficiently separate fluids.

20 Claims, 6 Drawing Sheets

000# FILTER SYSTEM WITH FUEL-WATER SEPARATOR

CROSS-REFERENCE TO RELATED APPLICATION

This application is a non-provisional application claiming priority under 35 U.S.C. 119(e) to U.S. Provisional Application Ser. No. 61/389,045 filed on Oct. 1, 2010.

TECHNICAL FIELD

The field of this disclosure is filter systems. More specifically, the field is canister filter systems for separating liquids, such as fuel and water, and which have drains for draining the canister.

BACKGROUND

Canister filter systems with fluid separator filters are used extensively today on equipment such as internal combustion engines, construction and mining machinery, and many other types of industrial machinery. They are used to filter contaminants from fluids in fuel systems, and separate out fluids, such as water, and the like from fuel.

A canister filter system typically includes a base which is often attached to the equipment, a canister (also sometimes called a housing, cup, can, or cover), and a filter which is removably positioned inside the canister. After the filter is positioned inside the canister, the canister is attached to the base with threads or other attachment means to form a sealed compartment around the filter. The canister, base, and filter cooperate to define fluid pathways through which fluid is directed through the filter. The filter contains filter media which traps and collects contaminants as the fluid passes through it and prevents water, or other fluids, from passing through the filter. The trapped contaminants may include dirt, water, soot, ash, metallic particles, and other harmful debris. The water, separated from the fuel, collects in the canister for later draining.

Eventually contaminants clog the filter media and reduce its effectiveness. When this occurs, the filter should be replaced. Typically only the filter needs to be replaced, while the canister, base, and other components are reused. The filter is designed to be conveniently replaced and readily disposed.

Canister filter systems may be provided with a drain. The drain facilitates the removal of fluid that is inside the canister. The drain is typically integrated into the canister.

U.S. Patent Application Publication No. US 2009/078623 A1 to Lauer discloses a filter device including a retaining screw captively secured by a rotary cage extending below a filter housing. The bottom of the cage forms a stop which limits the axial motion of the retaining screw when being screwed out.

SUMMARY

A canister filter system includes a base, a canister attachable to the base, and a filter having filter media positioned inside the canister. A drain forms a seal with, and may releasably engage the filter when the drain is in a closed position. In an open position, the drain allows fluid to be removed from the canister.

In one aspect, the present disclosure is directed to a filter that comprises a sleeve that defines a reservoir, filter media that surrounds the reservoir, a cover and an endcap. The filter media allows a first fluid to pass into the reservoir but blocks the passage of impurities and a second fluid. The cover includes an opening to the outside of the filter. The endcap may include a lid that extends across the sleeve and the filter media, a housing surrounding a pocket extending from the lid, a pocket and a plurality of fins. The housing includes an interior surface and an exterior surface. The pocket defines a cavity disposed outside of the reservoir and may be configured to receive a sealing surface of a drain. An axial length of the pocket may be less than an axial height of the housing. The plurality of fins may be connected to an outer sidewall of the pocket and the inner sidewall of the pocket may be configured to releasably receive a drain.

In another aspect, the present disclosure is directed to a filter system comprising a canister, a drain and a filter positioned inside of the canister. The canister has an upper portion and a bowl having a floor. The drain is disposed in the bowl. The filter may include a sleeve defining a reservoir, filter media surrounding the reservoir, a cover attached to a first end of the sleeve, and an endcap disposed on a second end of the sleeve. The filter media allows a first fluid to pass into the reservoir but blocks the passage of impurities and a second fluid. The endcap may include a housing, a pocket and a plurality of fins. The housing may surround the pocket and may include an interior surface and an exterior surface. The axial length of the pocket may be less than an axial height of the housing. The pocket may define a cavity disposed outside of the reservoir and may be configured to receive the drain. The pocket may include a rim disposed around a perimeter of the cavity. The rim and the floor of the bowl may be separated by a gap.

In yet another aspect, the present disclosure is directed to a method of assembling a filter that comprises a sleeve, filter media, a cover and an endcap. The endcap may include a housing surrounding a pocket and may have outer fins extending radially from the housing. An axial length of the pocket may be less than an axial height of the housing. The pocket may define a cavity that is disposed outside of the sleeve. The method comprises surrounding the sleeve with filter media, positioning the endcap on a first end of the sleeve with the pocket positioned outside of the sleeve, and positioning the cover on the filter media until the cover flushly contacts of the sleeve and a flow path is defined from the sleeve through the cover to outside the cover.

DETAILED DESCRIPTION

Figure 1:
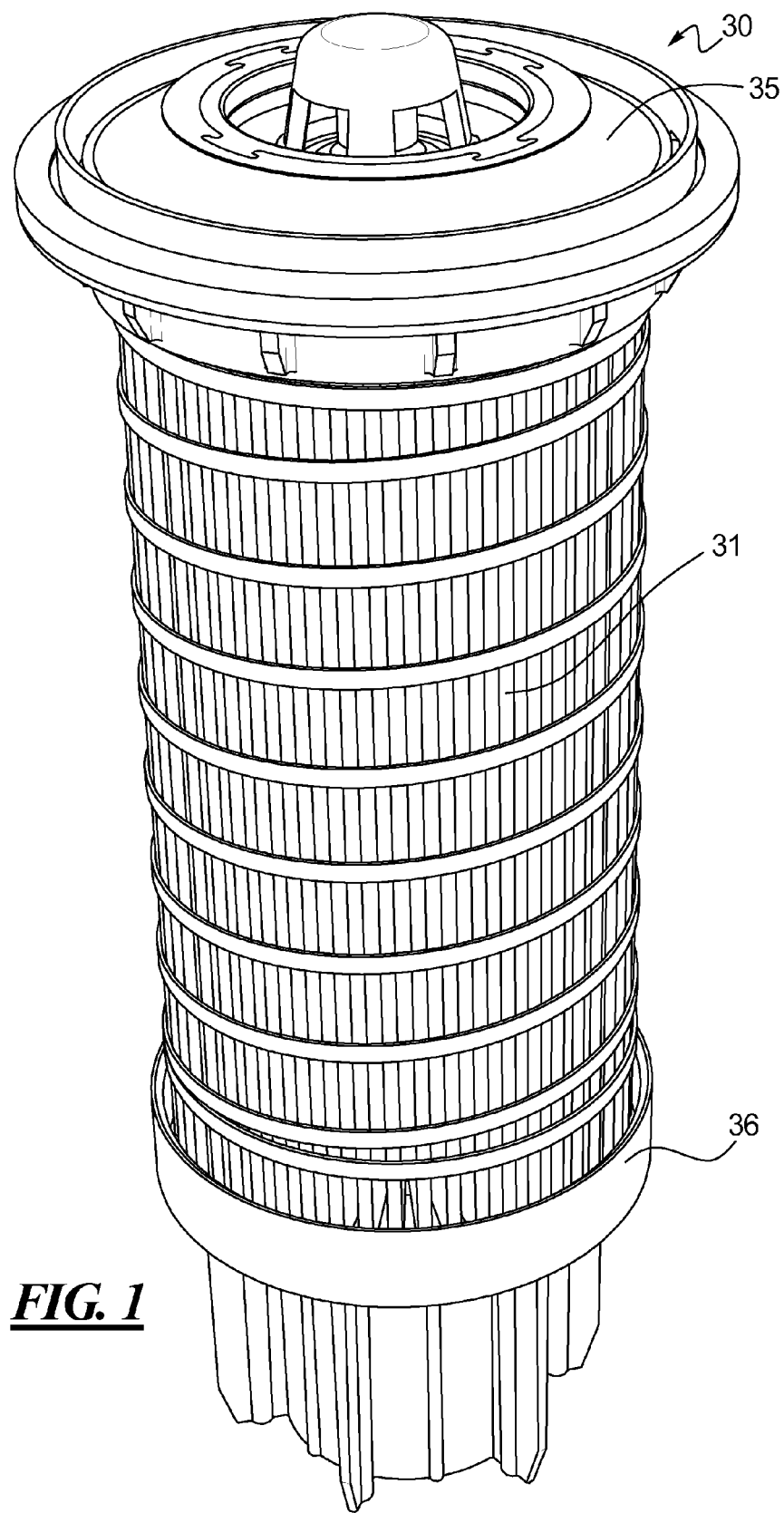
FIG. 1 is a perspective view of an embodiment of a fluid separator filter according to the disclosure.

The following is a detailed description of exemplary embodiments of the invention. The exemplary embodiments described herein and illustrated in the drawing figures are intended to teach the principles of the invention, enabling those of ordinary skill in this art to make and use the invention in many different environments and for many different applications. The exemplary embodiments should not be considered as a limiting description of the scope of patent protection. The scope of patent protection shall be defined by the appended claims, and is intended to be broader than the specific embodiments described herein.

FIG. 1 illustrates an embodiment of a filter 30 according to this disclosure. As will be discussed more thoroughly below, the filter 30 is comprised of a filter media 31 extending between a cover 35 and an endcap 36.

Figure 2:
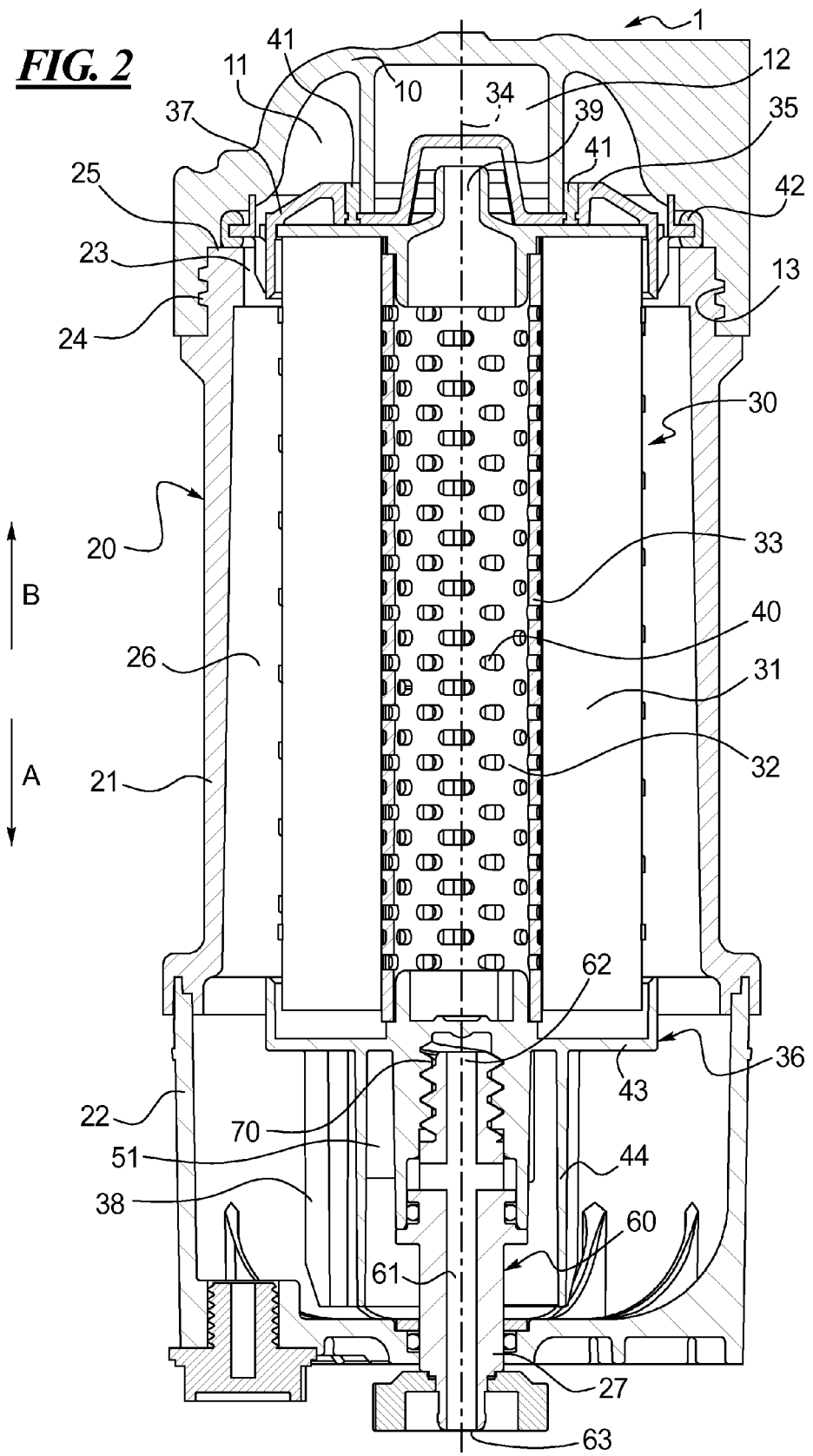
FIG. 2 is a cross-sectional view of an embodiment of a filter system including the fluid separator filter of FIG. 1.

Turning now to FIG. 2, a cross-sectional view of a canister filter system 1 having a base 10, a canister 20, and a liquid separator filter 30 is illustrated. The general construction and use of a canister filter system is understood by those of ordinary skill in this art. Thus, all the details of the construction and use of canister filter system 1 need not be explained here. The canister filter system 1 may be used to filter diesel, gasoline or other liquid fuels for an engine and to separate water from such fuels. The canister filter system 1 with the features described herein could be adapted by those of ordinary skill in this art to serve many different purposes and suit many other applications.

The base 10 includes an inlet channel 11 for fluid inlet into the canister filter system 1, and an outlet channel 12 for fluid outlet from the canister filter system 1. The base also includes base threads 13.

The canister 20 comprises an upper portion 21 attached to a bowl 22. The bowl 22 is joined to the upper portion 21 and may be made of opaque, transparent or translucent material. The upper portion 21 has an open end 23 distal from the bowl 22. Adjacent to the open end 23 are canister threads 24 which can be engaged with base threads 13 to hold the canister 20 to base 10. Threads are one example of engagement structures which may be included on the base 10 and canister 20 to form a releasable engagement. Other engagement structures may be used as will be recognized by those of ordinary skill in this art.

The filter 30 may take many different forms depending on the particular application. In the illustrated embodiment, the filter 30 is well suited for separating water from fuel and filtering the fuel. While one embodiment is discussed below that describes the separation of water from fuel, in other embodiments the filter could be used for broader purposes, namely, to separate a first fluid from a second fluid and filter the first fluid. The filter 30 may include filter media 31 surrounding a reservoir 32 defined by sleeve 33. The reservoir 32 may be centralized within the filter media 31. The filter media 31 may be generally annular in shape and may circumferentially surround the reservoir 32. The sleeve 33 may define a longitudinal sleeve axis 34 and may be generally cylindrical in shape. The filter media 31 is disposed between the cover 35 and the endcap 36.

The filter 30 has an open end 37 and a closed end 38. The closed end 38 is disposed in the bowl 22 of the canister 20. The open end 37 is disposed proximal to the top 25 of the canister 20. The cover 35 is disposed on the open end 37 of the filter 30. The cover 35 includes an opening 39 for allowing passage of fluid to outlet channel 12 from the reservoir 32 defined by sleeve 33. Whereas, the endcap 36 is disposed on the closed end 38 of the filter 30 and prevents fluids in the bowl 22 from flowing through it into sleeve 33. The endcap 36 may extend continuously across the filter media 31 and the sleeve 33. Cover 35 and endcap 36 may be joined to opposite ends of the sleeve 33 via welding, adhesives, or other methods known to the art. Alternatively, several or all of sleeve 33, cover 35, and endcap 36 may be constructed as unitary components.

Unfiltered fluid comprising a first fluid and a second fluid to be filtered enters from the inlet channel 11 and flows to the cavity 26 between canister 20 and filter media 31. The filter media 31 is of a type known in the art to separate both impurities and a first fluid from a second fluid. In the embodiment described below, the first fluid is fuel and the second fluid is water. As noted previously, in other embodiments, other combination of fluids may be separated. Fuel passes into and through filter media 31, then into sleeve 33 through perforations 40 in the sleeve 33. Water does not pass through the filter media 31 and, because water is typically heavier than fuel, moves to the bowl 22 of the canister 20 where it accumulates for later removal.

Filtered fuel exits sleeve 33 through cover 35 and opening 39 into the outlet channel 12. The cover 35 defines a fluid channel out of filter media 31, and the endcap 36 functions as a barrier to prevent the unfiltered fuel and/or water from entering the reservoir 32, bypassing filter media 31 and flowing directly to outlet channel 12. Inner and outer seals 41 and 42 may be included on filter 30 to define and/or seal fluid passageways into and out of filter 30. The inner and outer seals 41, 42 may be annular. Inner seal 41 may be included on the cover 35 around opening 39 and adjacent the open end 37 of the filter 30 to help seal the inlet channel 11 from the outlet channel 12. Outer seal 42, larger in diameter than inner seal 41, may be formed around the perimeter of the cover 35 to provide a seal between canister 20 and base 10. This prevents fluid in inlet channel 11 from leaking out of the joint between canister 20 and base 10. Inner and outer seals 41, 42 may be integrally formed with cover 35, or attached with adhesives or other methods, as is known in this art.

Figure 3:
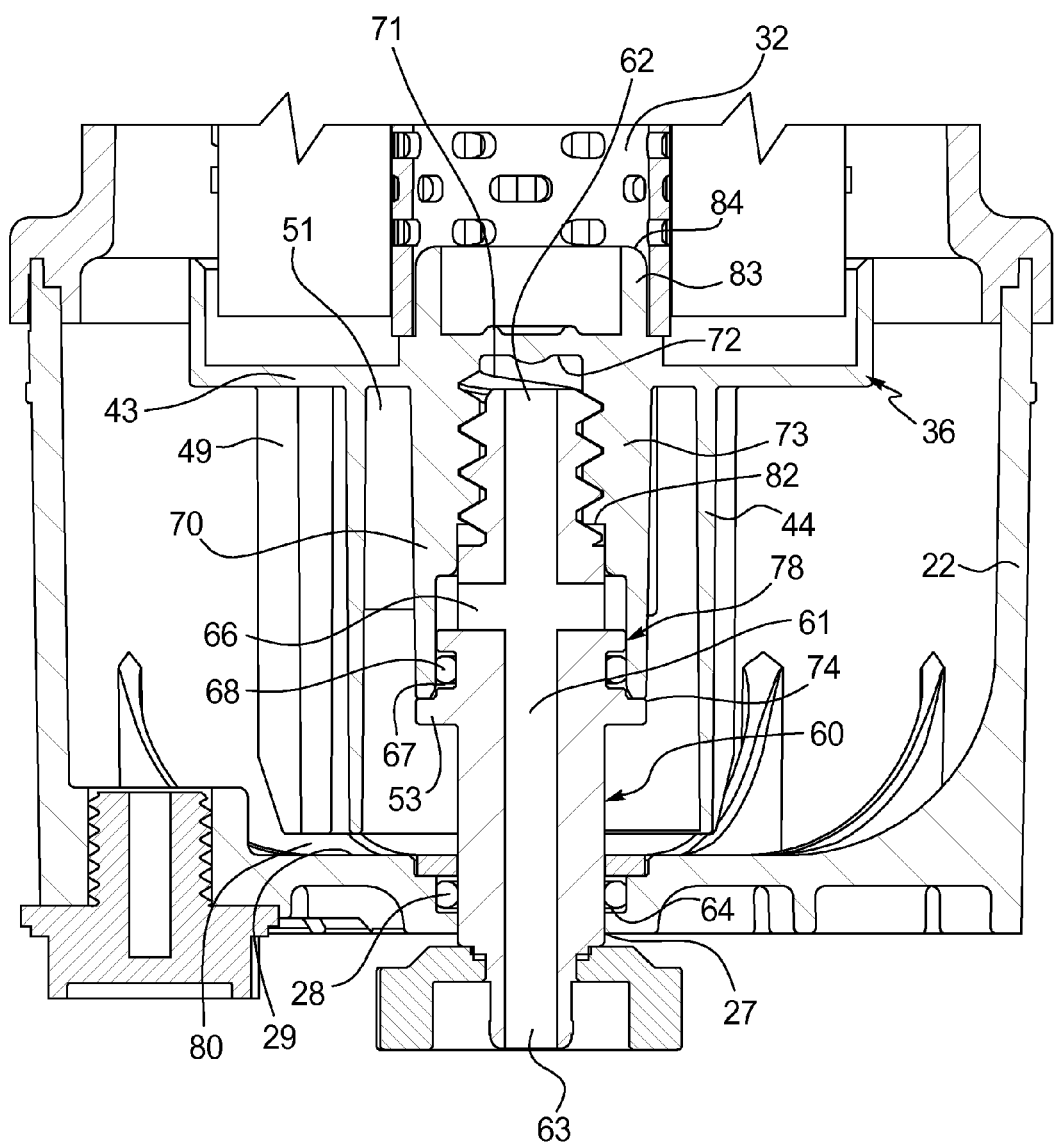
FIG. 3 is a cross-sectional view of a portion of the filter system of FIG. 2 with the drain in a closed position.
Figure 4:
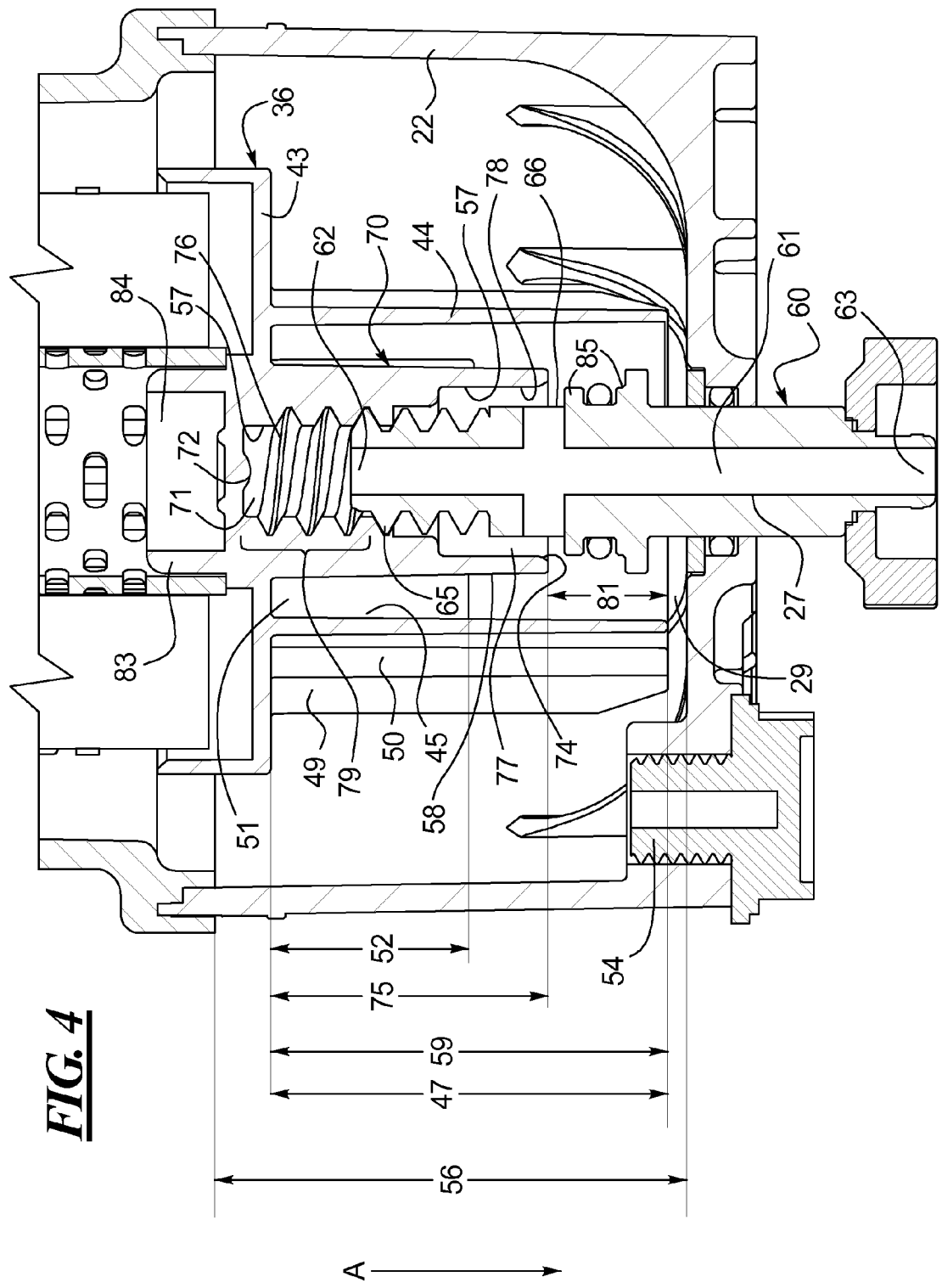
FIG. 4 is a cross-sectional view of a portion of the filter system of FIG. 2 with the drain in an open position.

With reference now to FIGS. 2-4, a drain 60 penetrates the bowl 22 of canister 20. The drain 60 provides a drain channel 61 for removing fluid from inside canister 20. The drain 60 may be elongated and may include a relief end 62 and an outlet end 63 connected to one another by a drain channel 61. The relief end 62 is positioned inside of canister 20. The outlet end 63 is positioned outside of canister 20. The drain 60 may be moved between a closed position and an open position. FIG. 3 illustrates the drain 60 in the canister 20 in a closed position. In the closed position, fluid is not able to flow through drain channel 61 out of the canister 20. By comparison, FIG. 4 illustrates the drain 60 in the open position. In the open position, fluid is able to flow through drain channel 61 and out of the canister 20 through outlet end 63. Drain 60 may be adapted to suit many different applications. The illustrated embodiment provides only one exemplary configuration for drain 60.

Canister bowl 22 forms a bore 27 in the floor 29 of the bowl 22. Drain 60 is positioned in, and is able to rotate in bore 27. An O-ring groove 64 may be formed in the bore 27 and a lower O-ring 28 may be positioned therein. Alternatively, the O-ring groove 64 may be formed around the exterior of drain 60. The lower O-ring 28 prevents fluid leaking between the drain 60 and the canister 20 and then through bore 27.

As illustrated in FIGS. 2-5, the endcap 36 may include a lid 43 extending across the sleeve 33 and the filter media 31. The lid 43 includes a retaining wall 83 extending into the reservoir 32. The retaining wall 83 may be cylindrical and an edge 84 of the retaining wall may be curved or sloped. Housing 44 extends from the lid 43 parallel to the sleeve axis 34. The housing 44 has an interior surface 45 and an exterior surface 46 and may be cylindrical, but is not limited to this shape. The exterior surface 46 of the housing 44 may have longitudinal ribs 48 disposed on it. The number and spacing of the ribs 48 on the exterior surface 46 may vary. When the filter 30 is disposed in the canister 20, the housing 44 is proximal to the floor 29 of the bowl 22. A fluid passage 80 may be formed between the housing 44 and the floor 29 of the bowl 22. The housing 44 surrounds a pocket 70. The pocket 70 may be disposed on and extending from the lid 43. The pocket 70 defines a pocket cavity 71 disposed outside of the reservoir 32. The pocket 70 includes a top 72, a sidewall 73 and a rim 74. The lid 43 may form the top 72 of the pocket 70 Sidewall 73 may be generally cylindrical in shape, although other shapes may be used. The pocket 70 may be configured to receive sealing surfaces 85 of a drain 60. The rim 74 may be disposed around the perimeter of the pocket cavity 71 and may be configured to receive a drain flange 53. The axial length 75 of the pocket 70, taken from the intersection of the pocket 70 and the lid 43 through the rim 74 of the pocket 70, may be less than an axial height 47 of the housing 44, taken in a direction A from the intersection of the housing 44 and the lid 43. The rim 74 of the pocket 70 and the floor 29 of the bowl 22 are separated by a gap 81. The gap 81 provides a fluid channel to the inlet opening 66 when the drain 60 is open.

A plurality of outer fins 49 may be disposed on an exterior surface 46 of the housing 44. The outer fins 49 may be any shape that extends outward from the exterior surface 46 of the housing 44. In the embodiment shown in FIGS. 2-5, the outer fins 49 are generally perpendicular to the housing 44 and to the pocket sidewall 73 and may have a generally rectangular shape with an edge 55 that may be chamfered. The outer fins 49 are not limited to this shape. In other embodiments, the outer fins 49 may have a beveled, curved or rounded edge 55. The outer fins 49 may also include fin ribs 50. The outer fins 49 may be joined to the housing 44 or may be integral with the housing 44. The quantity of outer fins 49 and the spacing on the exterior surface 46 of the housing 44 may vary. In addition, the outer fin longitudinal height 59 may be between about 0.7 to about 1.0 times the bowl height 56 in order to keep the filter media 31 substantially above and out of the water that accumulates in the bowl 22 during use of the canister filter system 1.

Drain 60 may cooperate with filter 30 to form a releasable engagement with filter 30, and a releasable seal with filter 30, when drain 60 is in its closed position. In the illustrated embodiment, drain 60 forms a releasable engagement with filter 30 through engagement structures that includes a releasable threaded connection. Mating threads 76 may be formed on a surface of the inner sidewall 57 of the pocket 70. Threads 65 may be formed on the drain 60 near the relief end 62. Drain 60 may be engaged with filter 30 by threading together threads 65 and mating threads 76. Threads are one example of engagement structures which may be included on the filter 30 and drain 60 to form a releasable engagement. Other appropriate engagement structures, as will be recognized by those of ordinary skill in this art, may also be used.

When in its closed position, with drain 60 releasably engaged with filter 30, a releasable seal may be made with filter 30. The releasable seal may be formed with seal structure which, in the illustrated embodiment, includes an inlet opening 66 and the pocket 70. The inlet opening 66 is disposed between the relief end 62 and the outlet end 63 and extends across drain 60 and intersects drain channel 61. Pocket 70 receives the inlet opening 66 when the drain 60 is closed and sealed. Moving drain 60 to its closed position moves inlet opening 66 inside of pocket 70, blocking the inlet opening 66 so that generally no fluid can enter therein. An O-ring groove 67 may be formed on drain 60 and an upper O-ring 68 may be positioned therein. This upper O-ring 68 may provide additional protection against fluid leaking from between drain 60 and pocket 70 and entering inlet opening 66 and then leaking out of the canister 20. When moving drain 60 to its closed position, as it advances into pocket 70, fluid trapped therein may need an escape path. This path may be provided by allowing trapped fluid to flow up the drain channel 61 and out the axial relief end 62 of drain 60 at the top of the pocket cavity 71.

Pocket 70 includes a mouth 77, a pocket inner sidewall 58, a pocket outer sidewall 59, and a top 72. The inner sidewall 58 has a smooth section 78 and a threaded section 79. Top 72 ensures that no fluid may flow from sleeve 33 into pocket 70 and inlet opening 66, and vice versa. Mating threads 76 are formed in the threaded section 79. Smooth section 78 may act as a part of the sealing structure by fitting tightly against the sealing surfaces 85 of drain 60 to prevent fluid from entering between and flowing from the mouth 77 to inlet opening 66. Smooth section 78 may also provide a surface against which the upper O-ring 68 in O-ring groove 67 may seal for additional protection against fluid leaking. To help maintain the smoothness of the surface of smooth section 78 and to also to provide a drain stop, the diameter of this section may be larger than the major diameter of the mating threads 76, forming a lip 82 between the smooth section 78 and threaded section 79. The larger diameter of smooth section 78 will help avoid the threads 65 on drain 60 from degrading the smooth surface used for sealing purposes.

When in an opened position, drain 60 is at least partially disengaged from filter 30, and inlet opening 66 is open so that fluid may flow into drain channel 61. In the illustrated embodiment with a threaded engagement, putting the drain 60 in an opened position requires turning drain 60 to disengage mating threads 76 and threads 65. As mating threads 76 and threads 65 disengage, drain 60 begins to advance out of pocket 70, unblocking inlet opening 66. Together, these features ensure that generally no fluid may enter inlet opening 66 of drain 60 except when inlet opening 66 has backed out of pocket 70, at least partially clearing the smooth section 78 and the mouth 77. Fluid is then free to flow from inside canister 20, through inlet opening 66, through drain channel 61, and exit through outlet end 63 of drain 60.

As shown in FIGS. 2-4, the drain 60 may include a flange 53. The flange 53 is disposed between the rim 74 and floor 29 and may be flushly received against the rim 74 when the drain is closed. The flange 53 prevents over tightening of the drain 60 by a user during installation of canister 20 in the base by providing a hard stop when the drain 60 is fully received into the pocket 70. The flange 53 may also stabilize the drain 60 in the pocket 70 during high pressure applications.

Figure 5:
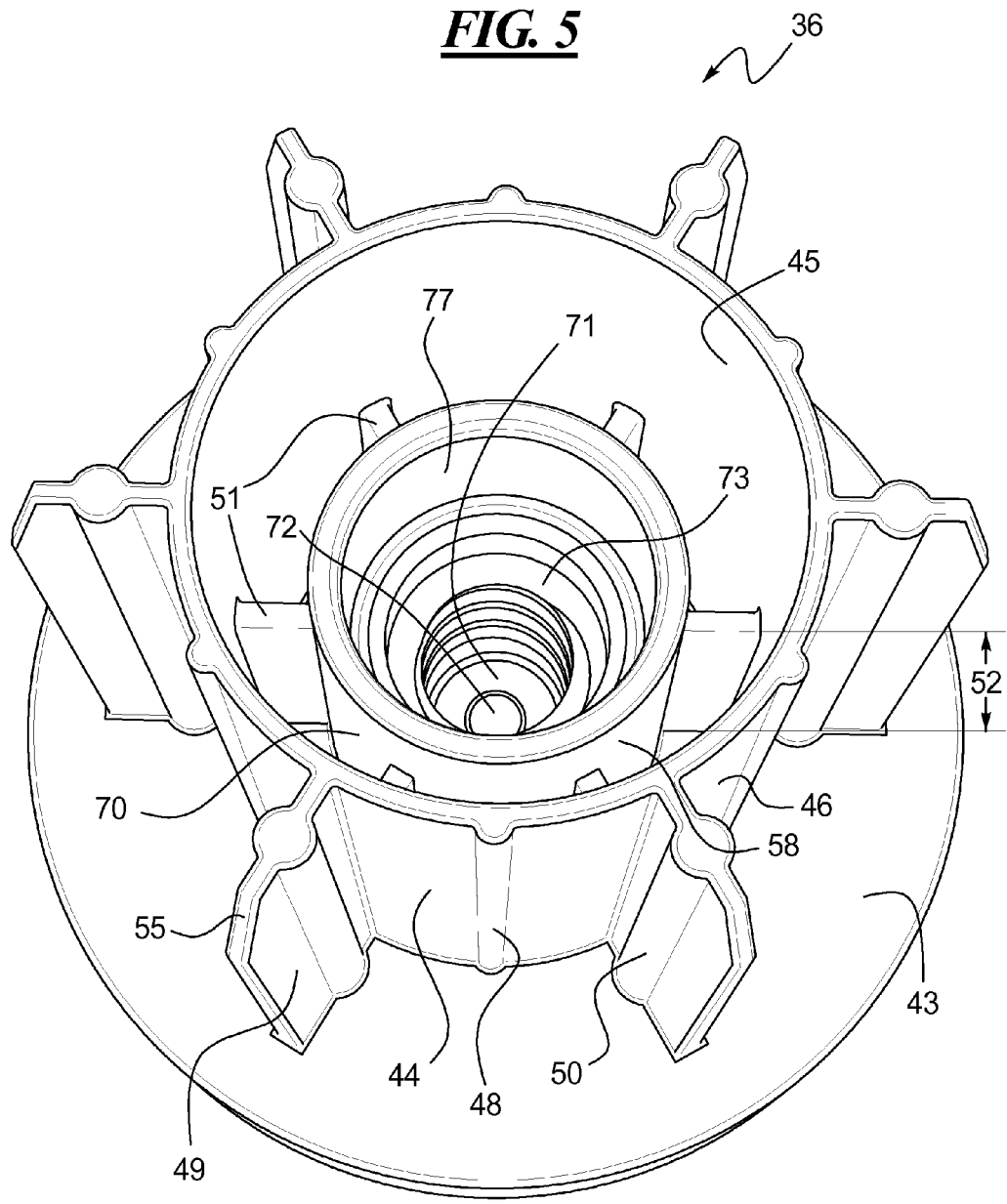
FIG. 5 is a perspective view of an embodiment of the endcap of the fluid separator filter of FIG. 1.
Figure 6:
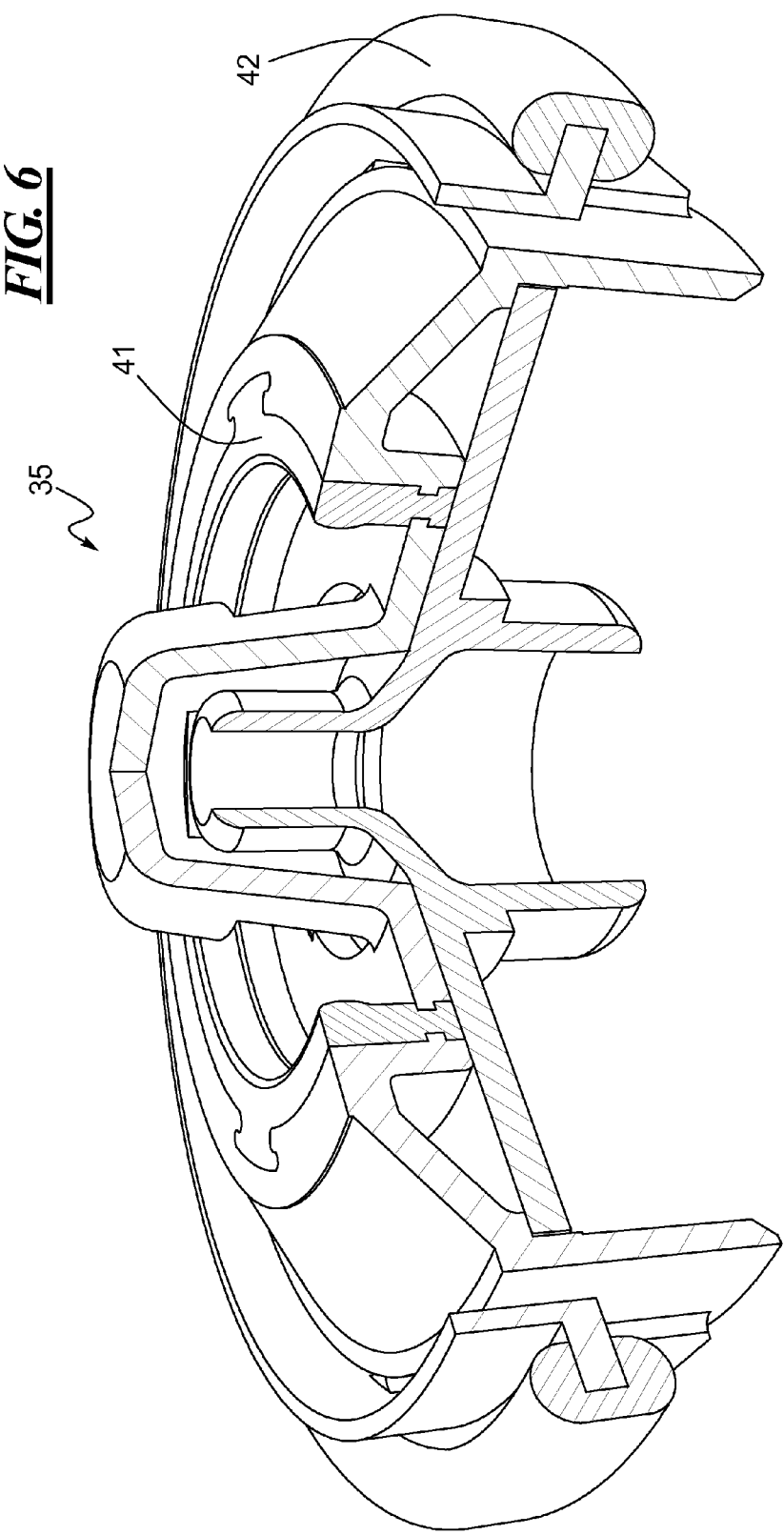
FIG. 6 is a cut-away view of an embodiment of the cover of the fluid separator filter of FIG. 1.

The pocket 70 may include a plurality of inner fins 51 connected to an outer sidewall 58 of the pocket 70. As best seen in FIG. 4-5, the inner fins 51 may be dimensioned such that the inner fin longitudinal height 52 is less than the axial pocket length 75. Alternatively, the fin height 52 may be more than or equal to the axial length 75 of the pocket 70.

Various different shapes and dimensions and combinations thereof for the inner fins 51 may be utilized. The inner fins 51 may be any shape that extends outward from the outer sidewall 58 of the pocket. In the embodiment shown in FIGS. 2-5, the inner fins 51 are generally perpendicular to the housing 44 and to the outer sidewall 58 and generally have a rectangular shape. The inner fins 51 are not limited to this shape. In other embodiments, the inner fins 51 may have beveled, curved or rounded edges. The inner fins 51 may be connected or affixed to the outer sidewall 58 of the pocket 70. Alternatively, the inner fins 51 may be integrally formed with the outer sidewall 58 or the other portions of the endcap 36. The quantity and spacing of the inner fins 51 on the outer sidewall 58 of the pocket 70 may vary. For example, the inner fins 51 may be positioned on the outer sidewall 58 closer to the top 72 of the pocket 70 than the mouth 77 of the pocket 70.

The inner fins 51 may provide increased structural support and stability to the pocket 70 during use in a filter system. In doing so, the inner fins 51 may reduce deformation of the pocket 70 and pocket cavity 71 that may occur during use in high pressure applications or that may occur over time from normal wear and tear. Reduction in such deformation also minimizes degradation in seal performance between the drain 60 and the pocket 70 resulting from deformation of the pocket 70. Such degradation may cause leaking of a closed drain 60 or jamming of the drain 60 in the pocket 70 when an operator tries to open the drain 60 to change the filter. When a drain 60 is so jammed, operators will often try to force the seal between the drain 60 and the pocket 70 to release; this may result in the drain 60 cracking or breaking off.

Over time, during use of the canister filter system 1, water collects in the bowl 22. When the bowl 22 is translucent or transparent, the level of accumulation of water may be visibly seen by a user. However, some applications may utilize an opaque bowl or the canister 20 and the bowl 22 may be positioned in a place that is not easily accessed. A disclosed embodiment includes an optional sensor 54 that may be beneficial for those types of applications or for user convenience. The sensor 54, such as those known to one skilled in the art, may be disposed in the bowl 22 or other portion of the canister 20 to sense the level of water collected. When the accumulated water reaches a threshold trigger, the sensor transmits a signal to alert the operator. The signal may be sent to a control panel on a machine or to a central monitoring system. In one embodiment, the sensor 54 monitors the change in electrical properties of the fluid in the canister to determine the amount of water present. Other types of appropriate sensors may be used.

The canister filter system 1 may be assembled by first positioning the filter 30 inside the canister 20. The canister 20 includes an open end 23 through which the filter 30 may pass. The filter 30 is positioned proximal to the floor 29 of the bowl 22. Next the drain 60 is caused to engage the filter 30. The drain 60 passes through the bore 27 in the bowl 22, with the relief end 62 projecting into the bowl 22 to engage with the filter 30. For drains 60 having a flange 53, the flange 53 is positioned generally flush with the rim 74 of the pocket 70 when the drain 70 and the filter 30 are fully engaged.

The height 47 of the housing 44 holds the closed end 38 of filter 30 around the top of the bowl 22. During use, as fuel and water are separated, water accumulates below the filter 30 in the bowl 22. The disclosed embodiment allows the filter 30 to filter more efficiently. Because in the disclosed embodiment the filter media 31 is substantially above and out of the accumulating water, more surface area of the filter media 31 may be exposed to unfiltered fuel than would otherwise be possible if a portion of the filter media 31 were submerged in water. The placement of the pocket cavity 26 outside the reservoir 32 complements the raised position of the filter 30 because it positions the drain inlet opening 66 closer to the floor 29 of the bowl 22. Thus water is drained from near the floor 29. This is beneficial because, as the water is heavier than the fuel, the water nearer to the floor 29 of the bowl 22 is more pure than the water higher in the bowl 22. Placement of the drain 60 close to the floor 29 thus allows for more efficient evacuation of the water from the canister 20.

The filter 30 may be assembled by surrounding the sleeve 33 with filter media 31 and positioning the endcap 36 on the bottom end of the sleeve 33 with the pocket 70 positioned outside of the sleeve 33. The cover 35 is positioned on the filter media 31 until the cover 35 flushly contacts a top of the sleeve 33 and a flow path is defined from the sleeve 33 through the cover 35 to outside the cover 35.

INDUSTRIAL APPLICABILITY

The present disclosure provides a filtering system having applicability in any industrial setting where fluids need to be filtered and separated such as, but not limited to, diesel engines, internal combustion engines, gas turbine engines, vehicles, earth moving machines and the like. The canister filter system may be used to separate two fluids, such as fuel and water, and filter contaminants from fuel systems, and the like, while permitting fluid to be conveniently drained via the drain. Positioning the filter media above the pool of water, allows the filter media to separate fluids and filter fuel more efficiently than it would if a portion of the filter media was submerged in water. Positioning of the pocket below the reservoir and the drain proximal to the floor of the bowl provides for more efficient removal of the water from the canister.

We claim:

1. A filter comprising:
   a sleeve defining a reservoir and disposed between a cover and an endcap;
   filter media surrounding the reservoir and allowing a first fluid to pass into the reservoir but blocking the passage of impurities and a second fluid;
   the cover including an opening to outside of the filter; and
   the endcap including:
      a lid that extends across the sleeve and the filter media;
      a housing surrounding a pocket extended from the lid, the housing including an interior surface and an exterior surface;
      the pocket defining a cavity disposed outside of the reservoir and configured to receive a sealing surface of a drain, wherein an axial length of the pocket is less than an axial height of the housing; and
      a plurality of outer fins disposed on the exterior surface of the housing.

2. A filter according to claim 1, wherein at least one of the plurality of outer fins has a chamfered edge.

3. A filter according to claim 1, wherein at least one of the plurality of outer fins is substantially perpendicular with the housing.

4. A filter according to claim 3, the housing further comprising a plurality of ribs disposed on the exterior surface of the housing.

5. A filter according to claim 1, the pocket further including an inner sidewall having a threaded section and a generally smooth section configured to receive a sealing surface of the drain, the threaded section disposed above the smooth section.

6. A filter according to claim 5, wherein the generally smooth section is configured to receive an O-ring seal.

7. A filter according to claim 1, the pocket further comprising a plurality of inner fins connected to an outer sidewall of the pocket, and disposed between the pocket and the housing.

8. A filter according to claim 1, wherein the outer fins include fin ribs.

9. A filter according to claim 1, wherein the axial height of the housing is substantially the same as an outer fin height.

10. A filter according to claim 1, wherein the lid includes a retaining wall extending into the reservoir and a plurality of ribs on the exterior surface of the housing.

11. A filter according to claim 10, wherein the retaining wall has a curved wall edge.

12. A filter according to claim 1, the pocket further including a rim configured to receive a flange.

13. A filter according to claim 1, wherein an outer fin height is between about 0.7 to about 1.0 times a bowl height.

14. A filter according to claim 1, wherein the housing is a cylinder.

15. A filter system comprising:
a canister including an upper portion and a bowl having a floor;
a drain disposed in the bowl; and
a filter positioned inside the canister, the filter including:
a sleeve defining a reservoir;
filter media surrounding the reservoir and allowing a first fluid to pass into the reservoir but blocking the passage of impurities and a second fluid;
a cover attached to a first end of the sleeve; and
an endcap disposed on a second end of the sleeve, the endcap extending continuously across the filter media and sleeve, the endcap including:
a housing surrounding a pocket, the housing including an interior surface and an exterior surface, wherein an axial length of the pocket is less than an axial height of the housing;
the pocket defining a cavity disposed outside of the reservoir and configured to receive the drain, the pocket including a rim disposed around a perimeter of the cavity, the rim and the floor of the bowl separated by a gap; and
a plurality of inner fins disposed between the pocket and the housing.

16. The filter system according to claim 15 further comprising a plurality of outer fins disposed on the exterior surface of the housing.

17. The filter system according to claim 16, wherein each outer fin has a chamfered edge.

18. The filter system according to claim 15, the pocket further comprising an inner sidewall having a threaded section and a generally smooth section.

19. The filter system according to claim 18, wherein the drain defines an inlet opening and a drain channel intersecting the inlet opening and extending through the drain to the outside of the canister, the drain configured to be movable between a closed position wherein the smooth section of the pocket blocks fluid from flowing from the canister into the inlet opening of the drain, and an open position wherein fluid may flow from the canister into the inlet opening of the drain and out of the drain through the drain channel.

20. A method of assembling a filter that comprises a sleeve defining a longitudinal sleeve axis, filter media, a cover and an endcap, the endcap including a housing surrounding a pocket and having outer fins extending radially from the housing and in a direction substantially along the longitudinal sleeve axis, wherein an axial length of the pocket is less than an axial height of the housing, the pocket defining a cavity disposed outside of the sleeve, the method comprising:
surrounding the sleeve with filter media;
positioning the endcap on a first end of the sleeve with the pocket positioned outside of the sleeve; and
positioning the cover on the filter media until the cover flushly contacts the sleeve and a flow path is defined from the sleeve through the cover to outside the cover.

* * * * *